(12) United States Patent
Fujimoto et al.

(10) Patent No.: US 6,798,400 B2
(45) Date of Patent: Sep. 28, 2004

(54) SYSTEM, METHOD AND PROGRAM PRODUCTS FOR COUNTING KEY-IN OPERATION

(75) Inventors: Kousuke Fujimoto, Tokyo (JP); Riichi Imazeki, Tokyo (JP)

(73) Assignee: Sourcenext Corporation, Tokyo (JP)

( * ) Notice: Subject to any disclaimer, the term of this patent is extended or adjusted under 35 U.S.C. 154(b) by 322 days.

(21) Appl. No.: 10/144,886

(22) Filed: May 15, 2002

(65) Prior Publication Data

US 2002/0180706 A1 Dec. 5, 2002

(30) Foreign Application Priority Data

May 17, 2001 (JP) .................................. 2001-147361

(51) Int. Cl.$^7$ ................................................ G09G 5/00
(52) U.S. Cl. ...................................... 345/168; 345/17
(58) Field of Search ........................... 345/168, 17, 23, 345/467, 469, 172; 341/22, 23, 28

(56) References Cited

U.S. PATENT DOCUMENTS 6,275,218 B1 * 8/2001 Matsuda et al. ............ 345/172
6,320,519 B1 * 11/2001 Hsu et al. .................... 341/23

FOREIGN PATENT DOCUMENTS

| JP | 6-4020 | 1/1994 |
| JP | 2002-41215 | 2/2002 |

* cited by examiner

*Primary Examiner*—Michael Razavi
*Assistant Examiner*—Faranak Fouladi
(74) *Attorney, Agent, or Firm*—Wenderoth, Lind & Ponack, L.L.P.

(57) ABSTRACT

A system for counting a key-in operation has a keyboard, input key judging unit for judging an input key keyed-in by the keyboard to be an effective key, an ineffective key or a command key, input key counting unit for counting the number of inputs of each input key, count result storing unit for storing the number of inputs of each input key, count result detecting unit for detecting the number of inputs of each input key, character display control unit for generating a prescribed character according to a count result of each input key which is employed in displaying the count result, display for displaying the prescribed character generated by character display control unit, and mouse for controlling a movement of a pointer on a screen and for inputting a click signal.

12 Claims, 3 Drawing Sheets

SYSTEM, METHOD AND PROGRAM PRODUCTS FOR COUNTING KEY-IN OPERATION

FIELD OF THE INVENTION

This invention relates to a system and method for counting a key-in operation executed by a keyboard of a computer system. In particular, this invention relates to a system and method for counting a key-in operation, which generates a prescribed character according to a type of an inputted key and displays a result of a key-in operation graphically.

BACKGROUND OF THE INVENTION

A conventional computer system, method and program products execute a game screenplay according to a result obtained by counting the number of inputs of a specific key.

In the conventional computer system, method and program products, however, there is a disadvantage in that the computer system, method and program products can not execute a counting of keys inputted by a keyboard with judging a type of the keys.

Because, in the conventional computer system, method and program products, "Delete" key and/or "Back space" key among keys to be inputted by a keyboard are typed when an inputted key is cancelled. For example, the actual number of inputs of effective keys is 900 when the real number of inputs of keys is 1,000 and the number of inputs of "Delete" key and/or "Back space" key is 100.

In this manner, the conventional computer system, method and program products do not execute a counting of a real effective key-in operation among actual key-in operations and display a result of the counting graphically.

SUMMARY OF THE INVENTION

Accordingly, it is an object of the invention to provide a system, method and program products for counting a key-in operation which judges whether a key inputted is an effective key or an ineffective key, generates a prescribed character according to a type of the key and displays a count result of key-in operations graphically.

According to the first feature of the invention, a system for counting a key-in operation, which is a system for counting a key-in operation executed by a keyboard of a computer system, comprises a keyboard for executing a key-in operation, input key judging means for judging an input key keyed-in by the keyboard to be an effective key, an ineffective key or a command key, input key counting means for counting the number of inputs of each input key judged by the input key judging means, count result storing means for storing every number of inputs of effective keys, ineffective keys and command keys which is counted by the input key counting means, count result detecting means for detecting every number of inputs of the effective keys, the ineffective keys and the command keys which is stored by the count result storing means, character display controlling means for generating a prescribed character according to a count result of each input key that is detected by the count result detecting means which is employed in displaying the count result, and displaying means for displaying the prescribed character generated by the character display controlling means, and, the prescribed character is displayed visually when part of a screen of the displaying means is enlarged according to a predetermined calling command.

According to the second feature of the invention, a method for counting a key-in operation, which is a method for counting a key-in operation executed by a keyboard of a computer system, comprises the steps of (A) judging an input key keyed-in by a keyboard to be an effective key, an ineffective key or a command key, (B) counting the number of inputs of each judged input key, (C) storing every counted number of inputs of effective keys, ineffective keys and command keys, (D) detecting every stored number of inputs of the effective keys, the ineffective keys and the command keys, (E) generating a prescribed character according to a detected count result of each input key which is employed in displaying the count result, (F) displaying the generated prescribed character visually when part of a display screen is enlarged according to a predetermined calling command.

According to the third feature of the invention, a program for counting a key-in operation, which is a program for counting a key-in operation executed by a keyboard of a computer system, comprises the steps of (A) judging an input key keyed-in by a keyboard to be an effective key, an ineffective key or a command key, (B) counting the number of inputs of each judged input key, (C) storing every counted number of inputs of effective keys, ineffective keys and command keys, (D) detecting every stored number of inputs of the effective keys, the ineffective keys and the command keys, (E) generating a prescribed character according to a detected count result of each input key which is employed in displaying the count result, (F) displaying the generated prescribed character visually when part of a display screen is enlarged according to a predetermined calling command.

BRIEF DESCRIPTION OF THE DRAWINGS

The invention will be described in more detail in conjunction with the appended drawings, wherein.

DETAILED DESCRIPTION OF THE PREFERRED EMBODIMENTS

Referring to accompanying drawings, embodiments of a system, a method and program products for counting a key-in operation according to the present invention will be explained as follows.

Figure 1:
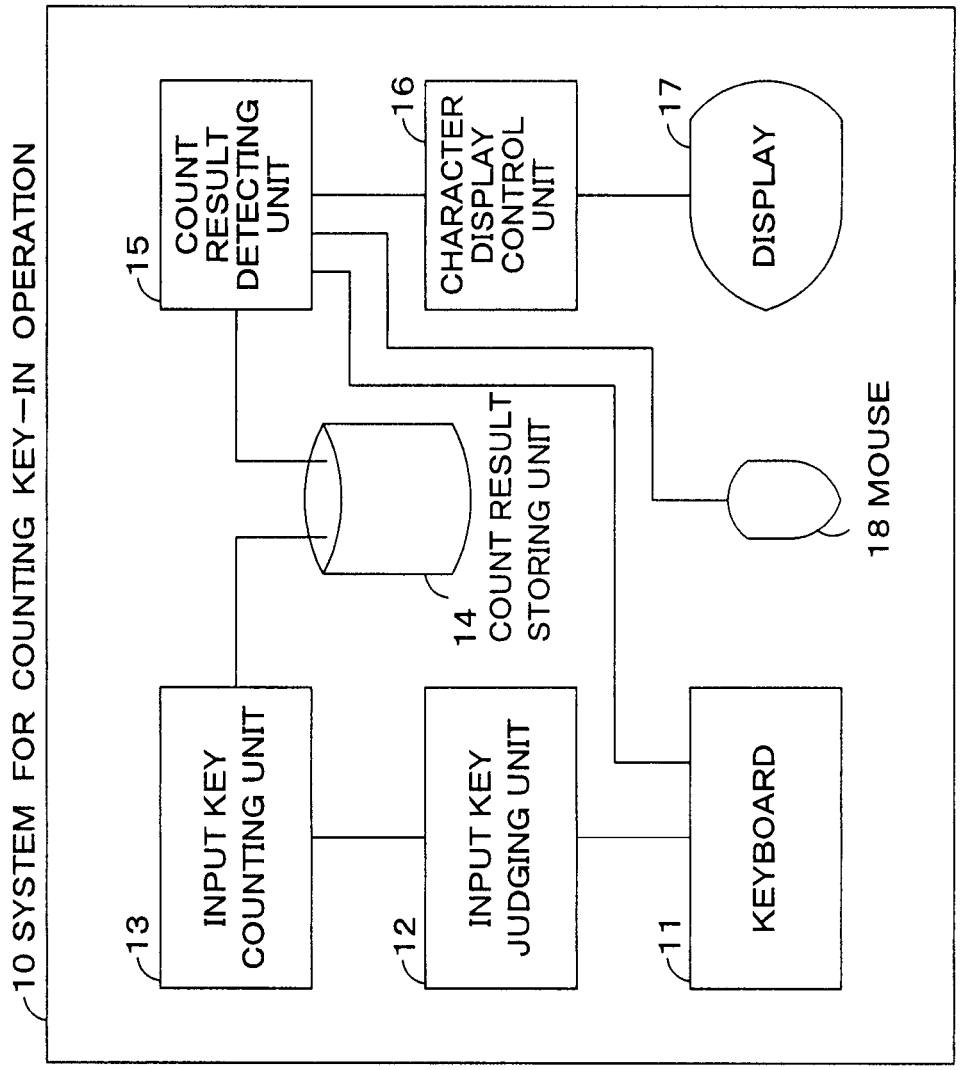
FIG. 1 is a diagram showing an example of a system for counting a key-in operation according to the present invention.

FIG. 1 is a diagram showing an example of the system for counting a key-in operation according to the present invention. System 10 for counting a key-in operation comprises keyboard 11 for executing a key-in operation, input key judging unit 12 for judging an input key keyed-in by keyboard 11 to be an effective key, an ineffective key or a command key, input key counting unit 13 for counting the number of inputs of each input key judged by input key judging unit 12, count result storing unit 14 for storing every number of inputs of effective keys, ineffective keys and command keys which is counted by input key counting unit 13, count result detecting unit 15 for detecting every number of inputs of the effective keys, the ineffective keys and the command keys which is stored by count result storing unit 14, character display control unit 16 for generating a prescribed character according to a count result of each input key that is detected by count result detecting unit 15 which is employed in displaying the count result, display 17 for displaying the prescribed character generated by character display control unit 16, and mouse 18 for controlling a movement of a pointer on a screen of display 17 and for inputting a click signal.

According to a predetermined calling command based on the click signal by mouse 18, part of the screen of display 17 is enlarged, and then, the prescribed character is displayed visually on the screen of display 17.

And, character display control unit 16 generates a displaying form of the prescribed character, such as "egg", "larva", "pupa" or "imago", according to the count result.

Moreover, character display control unit 16 determines a displaying form of the prescribed character according to the count results of the effective keys and the ineffective keys. That is, the number of inputs of effective keys can be used as a growth counting of the prescribed character or a value calculated by using a following equation may be used.
(Equation 1)

$$\text{Growth counting} = \text{number of inputs of effective keys} - \text{number of inputs of ineffective keys}$$

For example, the displaying form is determined with "egg" when the growth counting is in the range of 0 to 9999, with "larva" when the growth counting is in the range of 10000 to 199999, with "pupa" when the growth counting is in the range of 200000 to 209999, and with "imago" when the growth counting is not less than 210000.

In this case, the effective keys are alphanumeric keys, the ineffective keys are "Delete" key and "Back space" key, and the command keys are "Enter" key and an input signal by clicking from the mouse.

And, the prescribed character may be generated arbitrarily or displayed as existing insects graphically. And, the setting of the growth counting is determined arbitrarily and animals, plants, and also astronomical objects, and so on can be used as the prescribed character.

Figure 2:
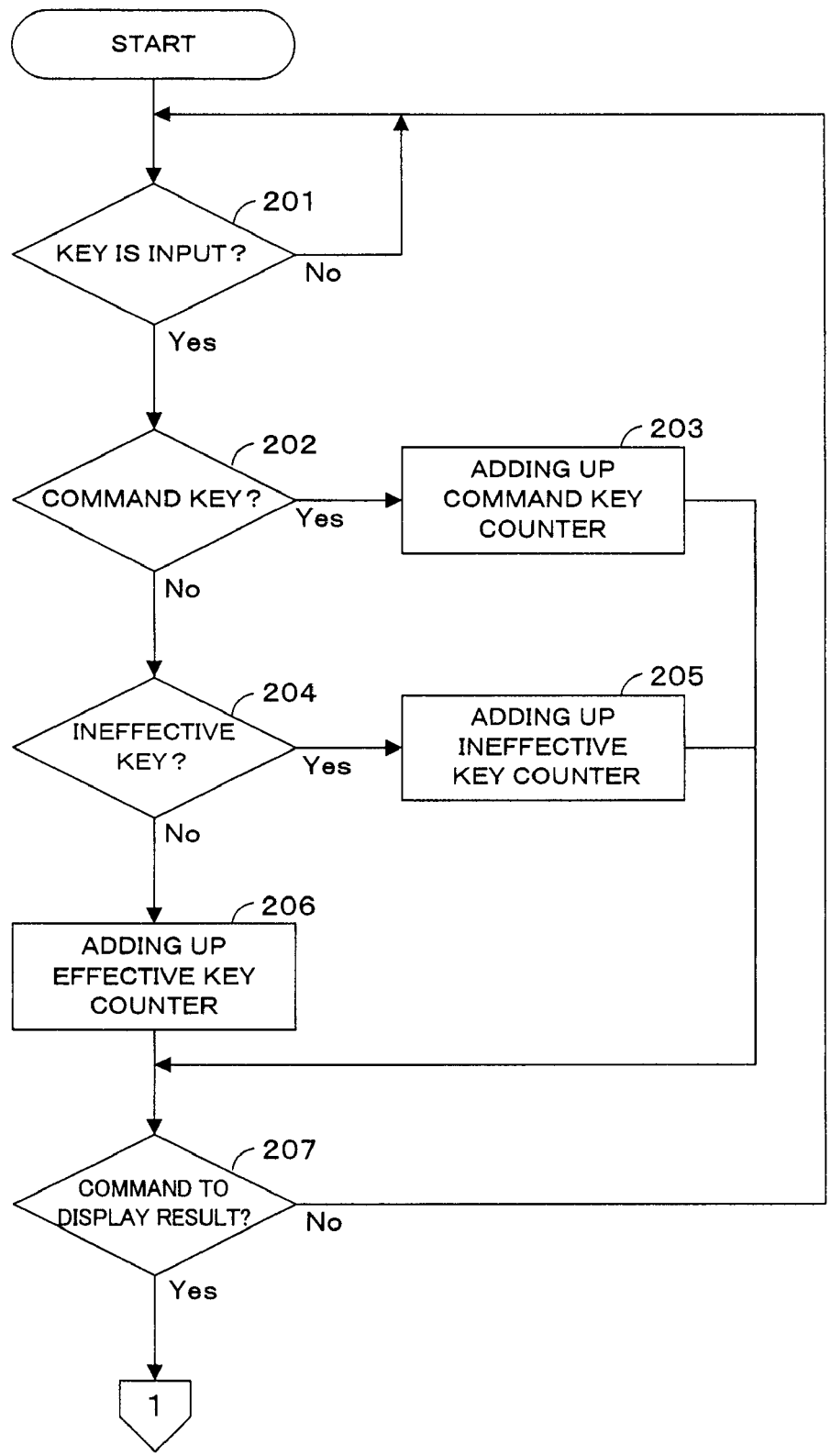
FIG. 2 is a flowchart showing the method for counting a key-in operation according to the present invention.
Figure 3:
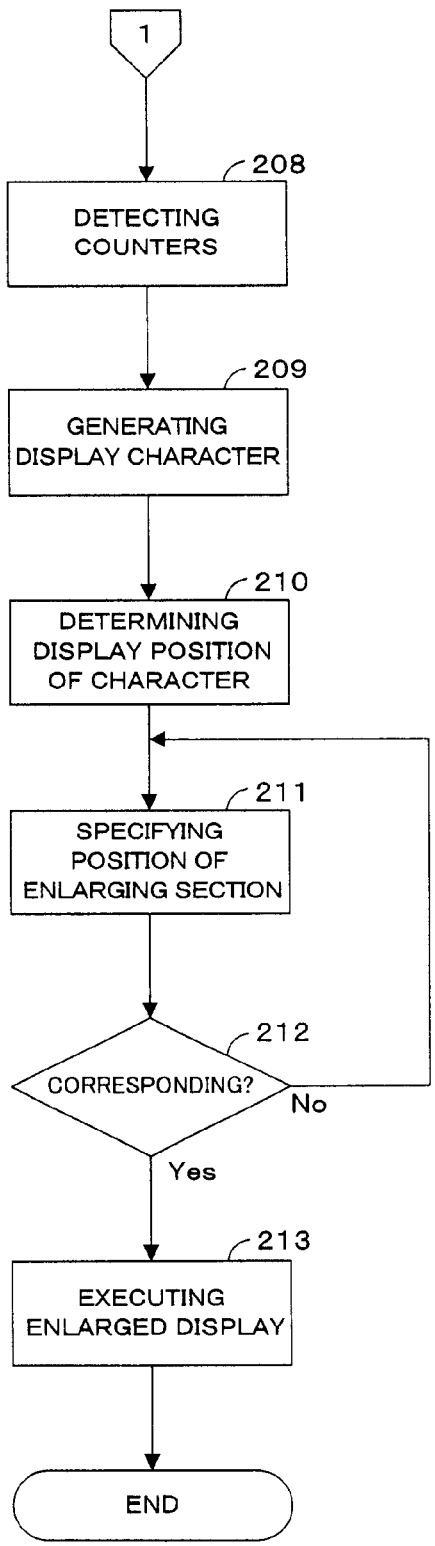
FIG. 3 is a flowchart showing the method for counting a key-in operation according to the present invention.

FIG. 2 and FIG. 3 are flowcharts showing the method for counting a key-in operation executed in the system for counting a key-in operation according to the present invention. In FIG. 1 to FIG. 3, an input key is keyed-in by keyboard 11 (in the step 201), whether the input key is a command key or not is judged by input key judging unit 12 (in the step 202).

When the input key is a command key (in the step 202), a counter of the command key is added up by input key counting unit 13 and is stored by count result storing unit 14 (in the step 203).

And, when the input key is not a command key (in the step 202), whether the input key is an ineffective key or not is judged by input key judging unit 12 (in the step 204). When the input key is an ineffective key (in the step 204), a counter of the ineffective key is added up by input key counting unit 13 and is stored by count result storing unit 14 (in the step 205).

On the other hand, when the input key is not a command key and an ineffective key (in the steps 202 and 204), a counter of the effective key is added up by input key counting unit 13 and is stored by count result storing unit 14 (in the step 206).

Next, when there is a command for displaying count results from keyboard 11 or mouse 18 (in the step 207), the number of inputs of effective keys, ineffective keys and command keys which is stored by count result storing unit 14 is detected by count result detecting unit 15 (in the step 208).

According to a count result of each input key which is detected by count result detecting unit 15, the prescribed character for displaying the count result is generated by character display control unit 16 (in the step 209) and a display position of the character on the screen of display 17 is determined by character display control unit 16 (in the step 210).

When part of the screen of display 17 is specified by a pointer with executing a point search by operating direction keys of keyboard 11 and/or mouse 18 and a position setting signal which determines a position of an enlarged section on the screen is inputted (in the step 211), a specified position of the screen by the position setting signal and the determined display position of the character on the screen of display 17 are compared by character display control unit 16 (in the step 212), and then, the prescribed character that is generated is displayed visually with an enlarged screen of the specified position by character display control unit 16 (in the step 213) when the display position of the character is within the range of the specified position.

The system and method for counting a key-in operation according to the present invention are described as mentioned above, and these functions can be transformed to a program for counting a key-in operation which is executed by a computer. That is, the program for counting a key-in operation comprises the steps of (A) judging an input key keyed-in by keyboard 11 to be an effective key, an ineffective key or a command key, (B) counting the number of inputs of each judged input key, (C) storing every counted number of inputs of effective keys, ineffective keys and command keys, (D) detecting every stored number of inputs of the effective keys, ineffective keys and the command keys, (E) generating a prescribed character according to a detected count result of each input key which is employed in displaying the count result, (F) displaying the generated prescribed character visually when part of a display screen is enlarged according to a predetermined calling command.

At this time, the step (E) is capable of generating a displaying form of the prescribed character, such as "egg", "larva", "pupa", or "imago", according to the count result. Moreover, the step (E) is capable of determining a displaying form of the prescribed character according to the count results of the effective keys and the ineffective keys.

In this case, the step (A) may assign inputs of alphanumeric keys to inputs of the effective key, inputs of "Delete" key and "Back space" key to inputs of the ineffective key, and inputs of "Enter" key and a clicking by the mouse to inputs of the command key.

As mentioned above, the system, the method and the program for counting a key-in operation according to the invention can count the number of inputs of effective keys and ineffective keys by judging a type of a key keyed-in by a keyboard, and generate a variable character according to the count result and display it graphically.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A system for counting a key-in operation, which is a system for counting a key-in operation executed by a keyboard of a computer system, comprising:

a keyboard for executing a key-in operation;

input key judging means for judging an input key keyed-in by said keyboard to be an effective key, an ineffective key or a command key;

input key counting means for counting the number of inputs of each input key judged by said input key judging means;

count result storing means for storing every number of inputs of effective keys, ineffective keys and command keys which is counted by said input key counting means;

count result detecting means for detecting every number of inputs of the effective keys, the ineffective keys and the command keys which is stored by said count result storing means;

character display controlling means for generating a prescribed character according to a count result of each input key that is detected by said count result detecting means which is employed in displaying the count result; and displaying means for displaying said prescribed character generated by said character display controlling means, wherein said prescribed character is displayed visually when part of a screen of said displaying means is enlarged according to a predetermined calling command.

2. The system for counting a key-in operation of claim 1, wherein said character display controlling means generates a displaying form of said prescribed character, such as "egg", "larva", "pupa" or "imago", according to said count result.

3. The system for counting a key-in operation of claim 2, wherein said character display controlling means determines a displaying form of said prescribed character according to count results of the effective keys and the ineffective keys.

4. The system for counting a key-in operation of claim 1, wherein said effective keys are alphanumeric keys, said ineffective keys are "Delete" key and "Back space" key and said command keys are "Enter" key and a clicking by a mouse.

5. A method for counting a key-in operation, which is a method for counting a key-in operation executed by a keyboard of a computer system, comprising the steps of:

(A) judging an input key keyed-in by a keyboard to be an effective key, an ineffective key or a command key;

(B) counting the number of inputs of each judged input key;

(C) storing every counted number of inputs of effective keys, ineffective keys and command keys;

(D) detecting every stored number of inputs of the effective keys, the ineffective keys and the command keys;

(E) generating a prescribed character according to a detected count result of each input key which is employed in displaying the count result; and (F) displaying the generated prescribed character visually when part of a display screen is enlarged according to a predetermined calling command.

6. The method for counting a key-in operation of claim 5, wherein said step (E) carries out generating a displaying form of the prescribed character, such as "egg", "larva", "pupa" or "imago", according to the count result.

7. The method for counting a key-in operation of claim 6, wherein said step (E) carries out determining a displaying form of the prescribed character according to count results of the effective keys and the ineffective keys.

8. The method for counting a key-in operation of claim 5, wherein said step (A) carries out judging inputs of alphanumeric keys as inputs of the effective keys, inputs of "Delete" key and "Back space" key as inputs of the ineffective keys and an input of "Enter" key and a clicking by a mouse as the command keys.

9. Program products for counting a key-in operation, which is program products for counting a key-in operation executed by a keyboard of a computer system, comprising the steps of:

(A) judging an input key keyed-in by a keyboard to be an effective key, an ineffective key or a command key;

(B) counting the number of inputs of each judged input key;

(C) storing every counted number of inputs of effective keys, ineffective keys and command keys;

(D) detecting every stored number of inputs of the effective keys, the ineffective keys and the command keys;

(E) generating a prescribed character according to a detected count result of each input key which is employed in displaying the count result; and (F) displaying the generated prescribed character visually when part of a display screen is enlarged according to a predetermined calling command.

10. The program products for counting a key-in operation of claim 9, wherein said step (E) carries out generating a displaying form of the prescribed character, such as "egg", "larva", "pupa" or "imago", according to the count result.

11. The program products for counting a key-in operation of claim 10, wherein said step (E) carries out determining a displaying form of the prescribed character according to count results of the effective keys and the ineffective keys.

12. The program products for counting a key-in operation of claim 9, wherein said step (A) carries out judging inputs of alphanumeric keys as inputs of the effective keys, inputs of "Delete" key and "Back space" key as inputs of the ineffective keys and an input of "Enter" key and a clicking by a mouse as the command keys.

* * * * *